(12) United States Patent
Satoh et al.

(10) Patent No.: US 7,659,726 B2
(45) Date of Patent: Feb. 9, 2010

(54) IMAGE FORMING APPARATUS WITH PLURAL AC SOURCES

(75) Inventors: Naoki Satoh, Yokohama (JP); Keiichi Sanada, Yokohama (JP); Takeshi Sano, Kawasaki (JP); Yoshihisa Ashikawa, Kawasaki (JP); Tomonori Maekawa, Kawasaki (JP)

(73) Assignee: Ricoh Company, Ltd., Tokyo (JP)

( * ) Notice: Subject to any disclaimer, the term of this patent is extended or adjusted under 35 U.S.C. 154(b) by 180 days.

(21) Appl. No.: 11/847,849

(22) Filed: Aug. 30, 2007

(65) Prior Publication Data

US 2008/0054878 A1     Mar. 6, 2008

(30) Foreign Application Priority Data

Aug. 30, 2006  (JP)  ............................. 2006-233363
Aug. 9, 2007   (JP)  ............................. 2007-208240

(51) Int. Cl.
*G01R 31/08*   (2006.01)
*G01R 31/36*   (2006.01)
*G01R 19/00*   (2006.01)

(52) U.S. Cl. ..................... 324/522; 324/771; 324/76.11

(58) Field of Classification Search ................. 324/771, 324/522, 76.11
See application file for complete search history.

(56) References Cited

U.S. PATENT DOCUMENTS 5,731,947 A * 3/1998 Hirose ........................ 361/160

| | | | |
|---|---|---|---|
| 6,806,445 B2 | 10/2004 | Satoh | |
| 7,122,767 B2 | 10/2006 | Sato et al. | |
| 7,127,189 B2 | 10/2006 | Takamatsu et al. | |
| 7,164,870 B2 | 1/2007 | Satoh | |
| 7,236,714 B2 | 6/2007 | Sato et al. | |
| 7,269,368 B2 | 9/2007 | Sato et al. | |
| 2005/0189923 A1 | 9/2005 | Ohishi et al. | |
| 2006/0024079 A1 | 2/2006 | Sato et al. | |
| 2006/0051119 A1 | 3/2006 | Kishi et al. | |
| 2007/0059016 A1 | 3/2007 | Sato et al. | |
| 2007/0071479 A1 | 3/2007 | Semma et al. | |
| 2007/0098433 A1 | 5/2007 | Yano et al. | |

FOREIGN PATENT DOCUMENTS

| | | |
|---|---|---|
| JP | 2003-244853 | 8/2003 |
| JP | 2003-323085 | 11/2003 |
| JP | 2005-121681 | 5/2005 |

\* cited by examiner

*Primary Examiner*—Amy He
(74) *Attorney, Agent, or Firm*—Oblon, Spivak, McClelland, Maier & Neustadt, L.L.P.

(57) ABSTRACT

An image forming apparatus includes two AC power input cords to be connected to an AC power source. The image forming apparatus can detect if at least one of the two AC power input cords is not connected to the AC power source. An input voltage detector or a zero-cross signal detector receives an input from the one AC input power cord, and detects a voltage state of connection to the AC power input cord. A controller utilizes signals from the input voltage detector or zero-cross signal detector to detect whether the one AC input power cord is connected to the AC power source. An operator can also be provided an indication if it is determined that the one AC power input cord is not connected to the AC power source.

3 Claims, 12 Drawing Sheets

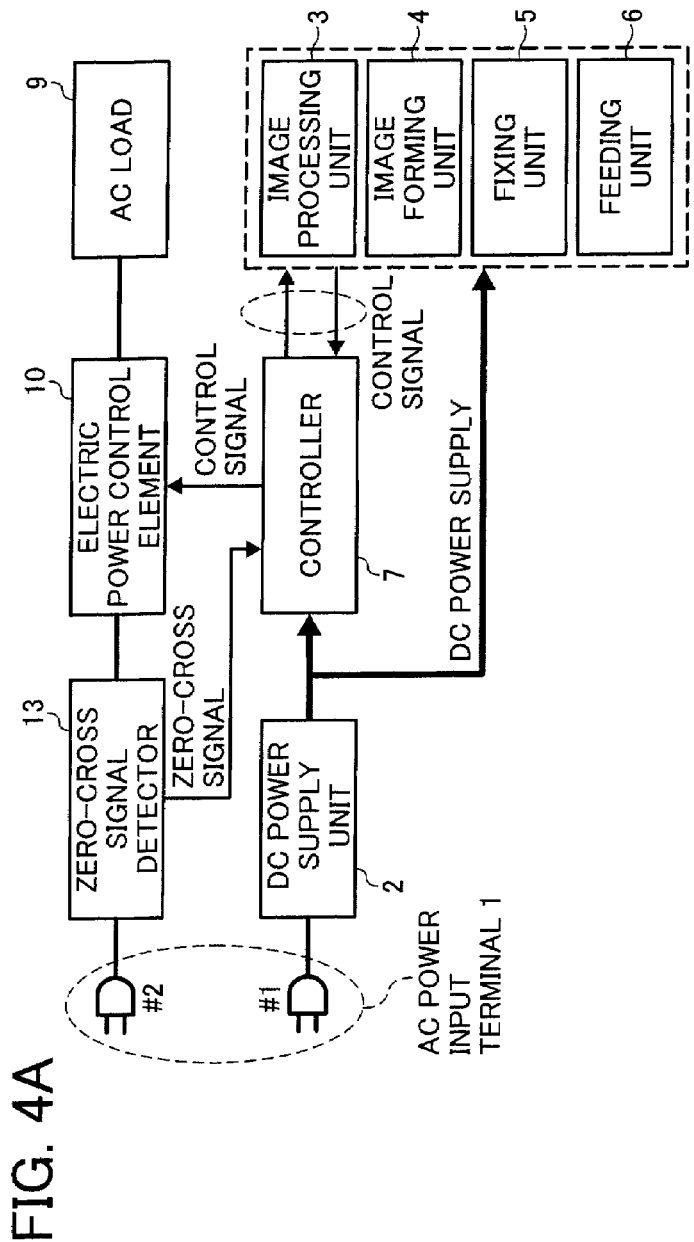
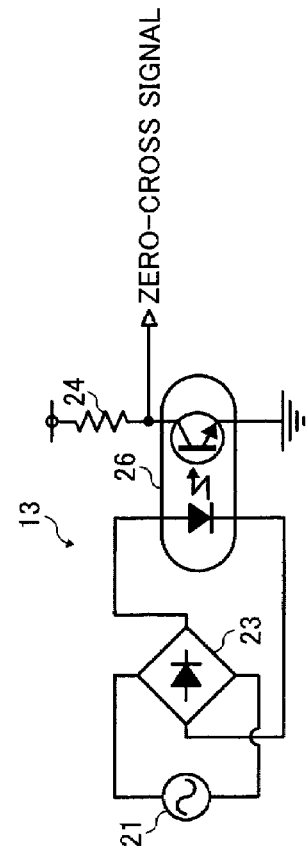
FIG. 4A
FIG. 4B

IMAGE FORMING APPARATUS WITH PLURAL AC SOURCES

CROSS-REFERENCE TO PRIORITY APPLICATIONS

The present patent document claims priority to corresponding Japanese application no. JP 2006-233363 filed on Aug. 30, 2006, and Japanese application no. JP 2007-208240 filed on Aug. 9, 2007, the entire contents of each of which are hereby incorporated herein by reference.

BACKGROUND OF THE INVENTION

1. Field of the Invention

The present invention generally relates to an image forming apparatus that connects to plural AC sources.

2. Discussion of the Background

In recent years, electric power consumption of image forming apparatuses has been increasing, resulting from image forming apparatuses including color input/output functions and improved operation speed. An image forming apparatus including color input/output functions requires an actuator configured to form plural images, and a controller that controls the actuator. An image forming apparatus with improved operation speed requires an improved action speed and torque of devices configured in the image forming apparatus, for example of the motor, etc. Such requirements in image forming apparatuses for color input/output functions and increased operation speed result in increased electric power consumption. An image forming apparatus generally receives electric power from an electric power socket, for example that has a capacity of 100V15 A in Japan.

If an image forming apparatus requires more electric power, the image forming apparatus may need to receive electric power from an electric power socket with the capacity of, for example, 100V20 A, or a power source voltage of an image forming apparatus may need to be 200V. Office facilities may not have such capacities. If an office facility does not have such capacities then an image forming apparatus may access plural AC sources with plural power source cords.

JP 2003-244853A proposes an image forming apparatus that interrupts the supply of AC power source to a main part of an image forming apparatus to secure a proper operation, if one power source cord is connected to the AC source but another power source cord is not connected to the AC source. Such an image forming apparatus can spread a load and assign the spread load for an AC consumption unit and an AC/DC converter for supplying the electric current from the plural electric cords. Such an image forming apparatus includes an AC relay on the AC source supplying line of the power source cord. The AC relay is turned ON if a DC load side of an AC line is active and a coil is receiving current. On the other hand, the AC relay does not turn ON if the DC load side of the AC line is not active and the coil is not receiving current. With that operation the image forming apparatus can operate electrically securely when the AC side of the power source cord is connected to the AC socket.

JP 2003-323085A proposes an image forming apparatus that can supply electric power efficiently to plural loads from plural power source cords even with a changing demand of electric power. The image forming apparatus therein changes a load of a supplying AC power source from a power source cord in accordance with plural modes that have different requirements of consumption of electric power. Such an image forming apparatus supplies electric power to a first heater from a first power source cord and supplies electric power to a second heater from a second power source, if when the mode is started the sum of electric power consumption of the plural heater exceeds a predetermined value. Such an image forming apparatus also supplies electric power to the first heater and the second heater from the first power source if in the mode the sum of electric power consumption of the plural heaters is below the predetermined value.

JP 2005-121681A proposes an image forming apparatus that can supply electric power efficiently and determine properly any error condition in an electric power control element. Such an image forming apparatus includes a main power source and a sub-power source. The image forming apparatus supplies electric power to a DC load, for example a CPU, etc., from the main power source. The image forming apparatus also supplies electric power to a side of an AC load, for example a fixing roller. Such an image forming apparatus display a prompt for an operator to connect to the sub-power source if the AC source detecting circuit detects no supply of electric power from the sub-power source and the image forming apparatus does not determine a solid state relay (SSR) error condition if the CPU receives an error signal from a SSR error detecting circuit. In other words, such an image forming apparatus determines an error of an electric power control element or interception of an AC source when the image forming apparatus detects an error of an electric power control element.

The image forming apparatuses as discussed above have the following drawbacks. First, a structure of an image forming apparatus including has two power source cords is more complicated than a structure of an image forming apparatus including only one power source cord. A control and structure of an image forming apparatus with two power source cords has to address a situation in which one power source cord is unconnected. If in such a situation one power source cord is unconnected, the image forming apparatus with two power source cords may not work normally. It also becomes difficult for an operator to determine the cause of such a problem, because this structure is more complicated, and thereby at least it typically requires more time for a user to determine such a problem.

SUMMARY OF THE INVENTION

One object of the present invention is to provide a novel image forming apparatus including two AC power input cords to connect to an AC power source, which can determine if one of the AC power source cords is not connected to the AC power source.

To achieve the above and other objects, a novel image forming apparatus includes two AC power input cords to be connected to an AC power source. The image forming apparatus can detect if at least one of the two AC power input cords is not connected to the AC power source. An input voltage detector or a zero-cross signal detector receives an input from the one AC input power cord, and detects a voltage state of connection to the AC power input cord. A controller utilizes signals from the input voltage detector or zero-cross signal detector to detect whether the one AC input power cord is connected to the AC power source. An operator can also be provided an indication if it is determined that the one AC power input cord is not connected to the AC power source.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 4A is a block diagram showing construction of an image forming apparatus of another embodiment of the present invention including two AC power input cords and a zero-cross signal detector;

FIG. 4B shows the zero-cross signal detector of FIG. 4A;

DESCRIPTION OF THE PREFERRED EMBODIMENTS

Figure 1A:
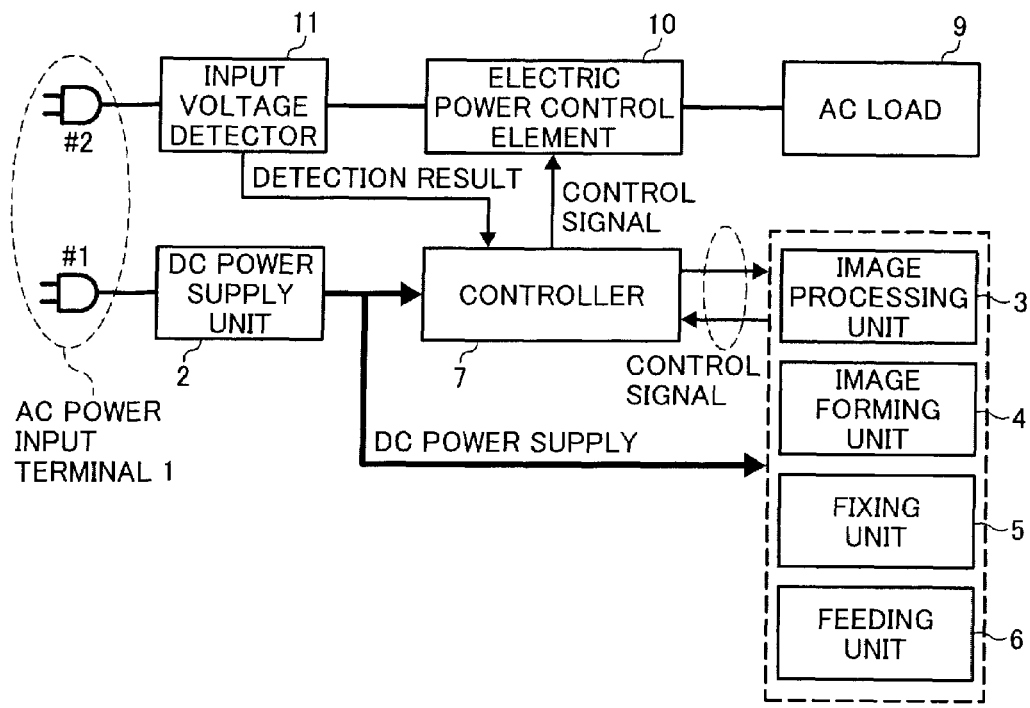
FIG. 1A is a block diagram showing construction of an image forming apparatus of an embodiment of the present invention.

In the following description, embodiments of the present invention are described with reference to the accompanying drawings, wherein the same reference numerals indicate corresponding or identical elements throughout the several views.

Figure 1B:
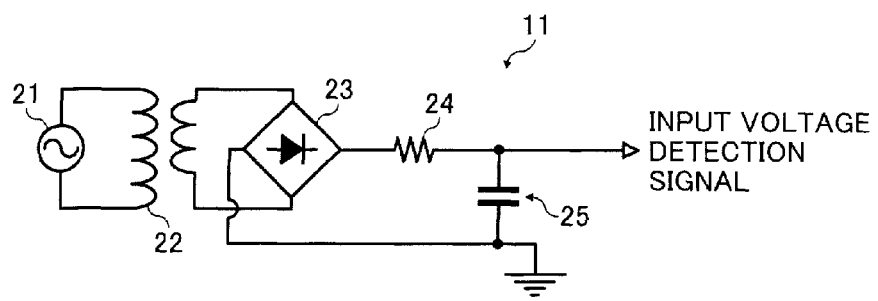
FIG. 1B is a diagram of an input voltage detector of FIG. 1A.

FIG. 1A is a block diagram showing construction of an image forming apparatus of an embodiment of the present invention, and FIG. 1B shows an input voltage detector 11 of FIG. 1A.

In FIG. 1A an AC power input terminal 1 is connected to an AC source (not shown). That AC power input terminal 1 includes two different AC power input cords #1 and #2. A DC power supply unit 2 is connected to the AC power input terminal 1, and supplies electric power to a controller 7, and other units 3-6. An image processing unit 3 processes an image. An image forming unit 4 forms an image. A fixing unit 5 fixes an image to a paper sheet. A feeding unit 6 feeds paper sheets. The controller 7 overall controls the image forming apparatus. An AC load 9, for example a heater, is connected to an electric power control element 10 that controls supplying electric power to the AC load 9. An input voltage detector 11 detects a voltage state input from the AC power input cord #2 of the AC power input terminal 1. The controller 7, as discussed in further detail below, receives the detection result from the input voltage detector 11, and utilizing that detection result can determine whether the AC power input cord #2 is connected or not connected to the AC power source.

The AC power input cord #1 of the AC power input terminal 1 supplies AC power to the DC power supply unit 2. The DC power supply unit 2 changes the supplied AC power to DC power and supplies the DC power to the image processing unit 3, the image forming unit 4, the fixing unit 5, the feeding unit 6, and the controller 7.

The other AC power input cord #2 of the AC power input terminal 1 supplies power to the electric power control element 10, which controls supplying electric power to the AC load 9, which for example may be a lamp, a heater, a motor, etc. The controller 7 receives an output from the input voltage detector 11, and controls the electric power control element 10, in addition to controlling other elements within the image forming apparatus.

As the image forming apparatus in FIG. 1A includes two AC power input cords #1, #2, such an image forming apparatus will not properly operate if both AC power input cords #1, #2 of the AC power input terminal 1 are not connected to the AC source. In such a device in FIG. 1A, if the AC power input cord #1 is not connected to the AC source, then the image forming apparatus would typically not operate at all, since the power supplied from that first AC power input cord #1 controls most elements including the controller 7. It is easy for a user to address such a situation as the user can easily determine that the AC power input cord #1 is not connected to the AC source, as the image forming apparatus would not work at all. The user can easily address this situation by plugging in the AC power input cord #1 to the AC source.

However, a more difficult to detect situation arises when only the AC power input cord #2 is not connected to the AC source. In such a situation, if the AC power input cord #1 is connected to the AC source, but the AC power input cord #2 is not connected to the AC source, then the controller 7 and other elements such as the image processing unit 3, image forming unit 4, fixing unit 5, and feeding unit 6 will still receive power, via the AC power input cord #1. Thereby, the image forming apparatus may appear to the operator as if it is operating properly. However, the image forming apparatus will not operate properly in such a situation because it will not receive the full power needed because the AC power input cord #2 is not connected to the AC power source.

Such a situation is more difficult for a user to detect because the image forming apparatus in such a situation may appear to be properly plugged in.

The present invention addresses such a situation by utilizing an input voltage detector 11 and controller 7 to detect whether the AC power input cord #2 is connected to an AC power source. That is, the image forming apparatus of FIG. 1A includes an input voltage detector 11 that detects a voltage state of the AC power input cord #2 to the AC source. That input voltage detector 11 is controlled by the controller 7.

The present invention can take advantage of the fact that such an input voltage detector 11 may already be needed in an image forming apparatus. That is, the input voltage detector 11 is an element that may also be used in image forming apparatuses to detect an input voltage of an AC source for the purpose of controlling an input power to a fixing roller in accordance with the input voltage of the AC source. Thus, the present invention may not even need to add an extra element to the image forming apparatus, but may just need to utilize an input voltage detector for an additional operation.

Thereby, a feature of the present invention is to utilize such an input voltage detector 11 and the signals output therefrom, and to supply such output signals to the controller 7. The controller 7 then utilizes such signals to determine whether the AC power input cord #2 is connected to the AC power source.

FIG. 1B shows an electronic diagram circuit of such an input voltage detector 11. Such an element 11 as shown in FIG. 1B includes an AC source 21, a transformer 22, a diode 23, a resistor 24, and a condenser 25.

With the device in FIGS. 1A, 1B, the controller 7 receives an output from the input voltage detector 11 such as shown in FIG. 1B. The controller 7 can then evaluate that input voltage detection signal, and if that input voltage detection signal is at zero volts, that will indicate that the AC power cord #2 connected to the input voltage detector 11 is not connected to the power source. Thereby, the device as shown in FIGS. 1A, 1B can detect such a situation.

The controller 7 can then utilize such a detection to control the image forming apparatus, for example to control another element, provide a display indication to an operator, etc., as discussed with respect to further embodiments below.

Figure 2:
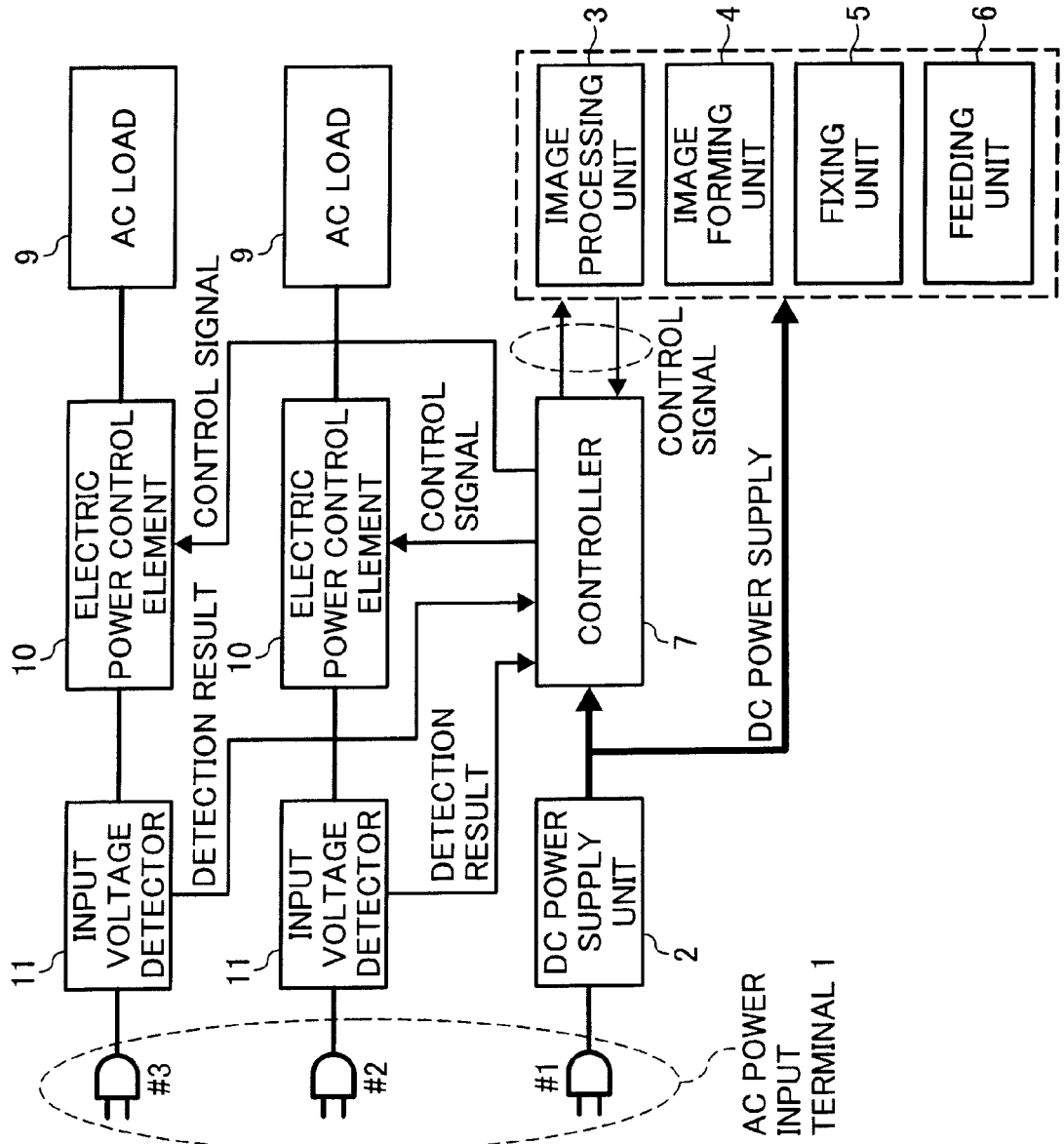
FIG. 2 is a block diagram showing construction of an image forming apparatus of another embodiment of the present invention that includes three power input cords.

FIG. 2 is a block diagram showing construction of an image forming apparatus similar to the embodiment of FIG. 1A except it utilizes an AC power input terminal 1 including three AC power input cords #1, #2, and #3. In such an embodiment voltage detecting units 11 are connected to both of the AC power input cord #2 and AC power input cord #3, and both supply detection results to the controller 7. Otherwise the operation of the embodiment in FIG. 2 is similar to that in FIGS. 1A and 1B.

Figure 3:
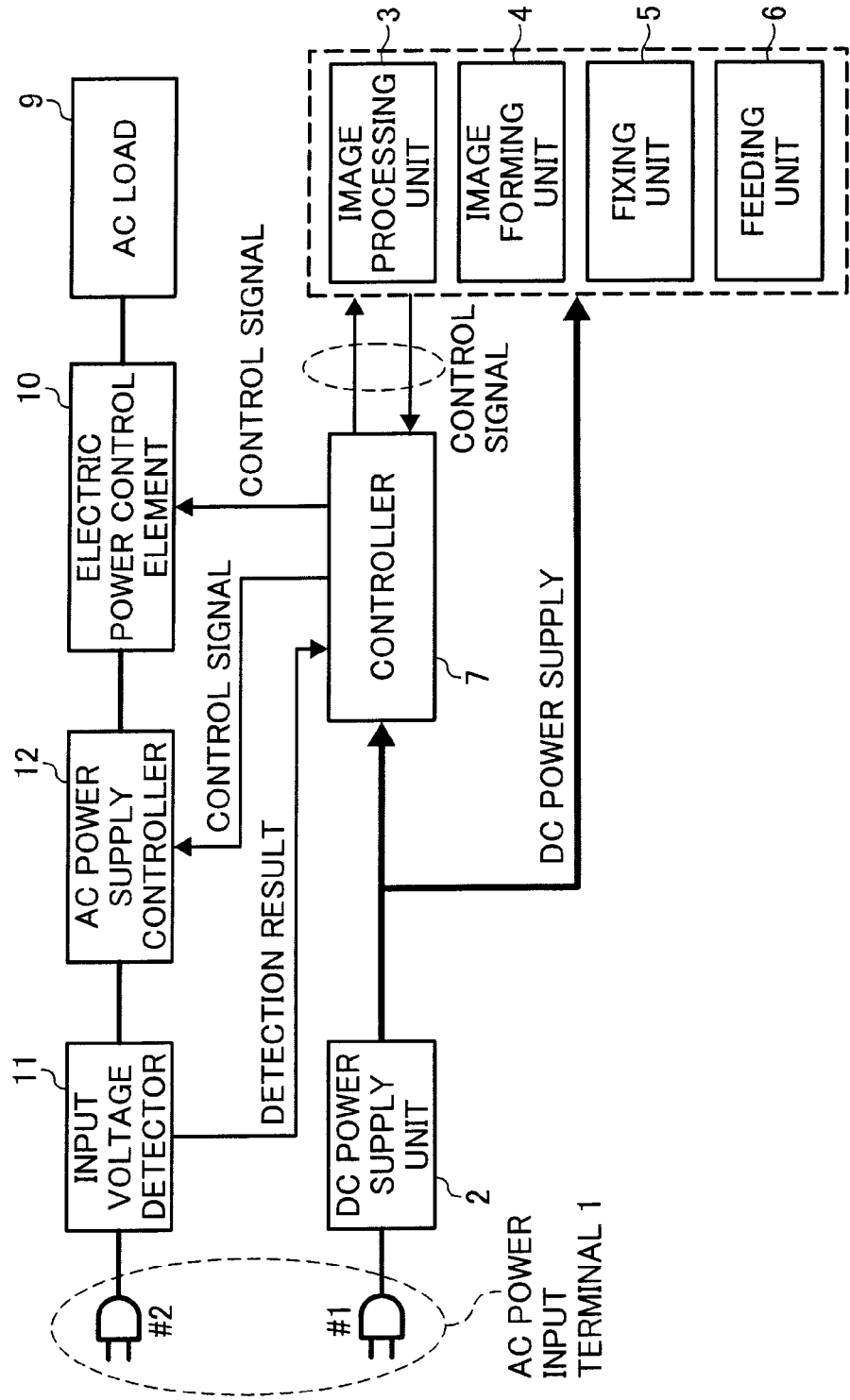
FIG. 3 is a block diagram showing construction of an image forming apparatus of another embodiment of the present invention including two AC power input cords and an AC power supply controller.

FIG. 3 is a block diagram showing construction of an image forming apparatus according to another embodiment of the present invention that is similar to the embodiment of FIG. 1A except the embodiment of FIG. 3 additionally includes an AC power supply controller 12 connected between the input voltage detector 11 and the electric power control element 10, and that receives a control signal from the controller 7. The AC power supply controller 12 controls AC power source by opening or shutting connection to an AC power source.

The embodiment of FIG. 3 includes the AC power supply controller 12 as a safety unit for the image forming apparatus that includes a lamp, a heater, a motor, etc. as the AC load 9. The embodiment of FIG. 3 can operate such that the AC power input terminal #2 can be virtually disconnected from the AC power source by an opening or shutting operation of the AC power supply controller 12 if any error condition is detected, or if the image forming apparatus does not receive AC power. In other words, the embodiment in FIG. 3 can virtually disconnect the AC power input cord #2 from an AC power supply, by an operation at the AC power supply controller 12. The image forming apparatus of FIG. 3 preferably does not position the position input voltage detector 11 between the electronic power control element 10 and the AC power supply controller 12, because with such a position the image forming apparatus may not be able to distinguish an error condition state, i.e., may not be able to distinguish if an error is in the input voltage detector 11 not properly detecting connection of the AC power input cord #2 to the AC power source, or if the error is in an opening and shutting operation at the AC power supply controller 12.

FIG. 4A is a block diagram showing construction of an image forming apparatus according to another embodiment of the present invention that instead of utilizing an input voltage detector 11, utilizes a zero-cross signal detector 13. Otherwise the embodiment of FIG. 4A corresponds to that of FIG. 1A. The zero-cross signal detector 13 detects a zero-cross of an AC source (not shown) to which the AC power input cord #2 is connected.

The image forming apparatuses in the embodiments of the present invention include the fixing unit 5 that fixes an image to a paper sheet by heating a transferred image on the paper sheet. It is generally the case that the fixing unit 5 includes a fixing heater that is heated up by receiving AC power. It has been known in image forming apparatuses to utilize a zero-cross signal for controlling the supply of AC power to such a fixing heater in the fixing unit 5, and an image forming apparatus may include a controller that controls a heating timing between a current zero-cross point and a next zero-cross point.

The embodiment of the present invention as shown in FIG. 4A utilizes such an existing zero-cross signal detector 13 for the additional purpose of detecting whether the AC power input cord #2 is connected to an AC power source. That is, although it has been known in the art to utilize a zero-cross signal detector 13 in an image forming apparatus, it has not been known to utilize such a zero-cross signal detector 13 for determining whether an AC input power cord is connected to an AC power source. The embodiment of the present invention in FIG. 4A utilizes a zero-cross signal detector 13 for such an operation, in addition for control of the fixing unit 5. Thereby, such an image forming apparatus does not have to increase in cost or size, by sharing a zero-cross signal detector 13.

FIG. 4B shows such a zero-cross signal detector 13, and that includes an AC source 21, a diode 23, a resistor 24, and a transistor 26. The transistor 25 changes from an ON state to an OFF state, and vice versa, if the fixing unit 5 is on. At that point the zero-cross signal occurs.

Figure 5A:
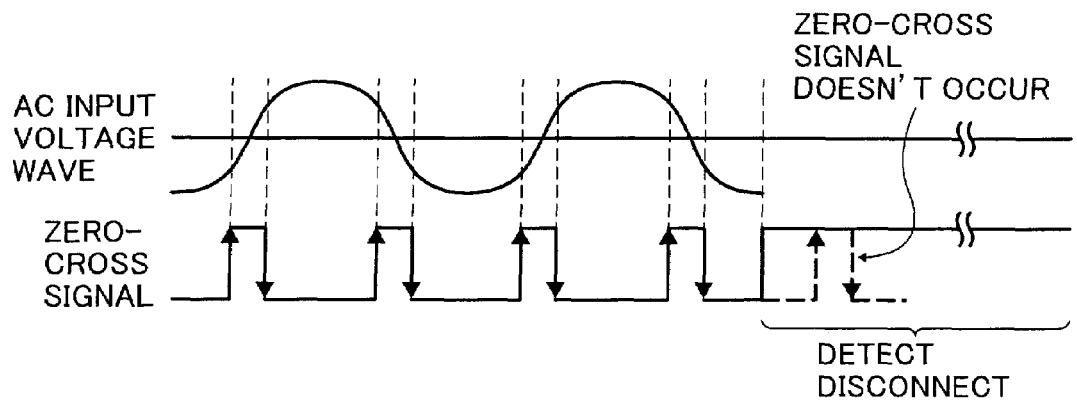
FIG. 5A shows the timing of detecting a zero-cross signal by the zero-cross signal detector of FIGS. 4A, 4B.

FIG. 5A shows a timing of detecting a zero-cross signal by the zero-cross signal detector 13. As shown in FIG. 5A a pulse of a zero-cross signal occurs if an AC voltage passes to zero volts. The zero-cross signal detector 13 detects the zero-signal, and the controller 7 can utilize such information to determine if the AC power input cord #2 is connected to an AC power source. The controller 7 specifically can check whether the zero-cross signal detector 13 output signal is shorter in cycle than a pulse width. The controller 7 can particularly operate to clear a non-detect counter (not shown) if the controller 7 recognizes the zero-cross signal output from the zero-cross signal detector 13. The non-detect counter can count up when the controller 7 does not recognize a zero-cross signal. The controller 7 then utilizes a value on the non-detect counter to determine whether the AC power input cord #2 is not connected to a power source, if the non-detect counter exceeds a predetermined number or a non-detecting time exceeds a predetermined time.

Figure 5B:
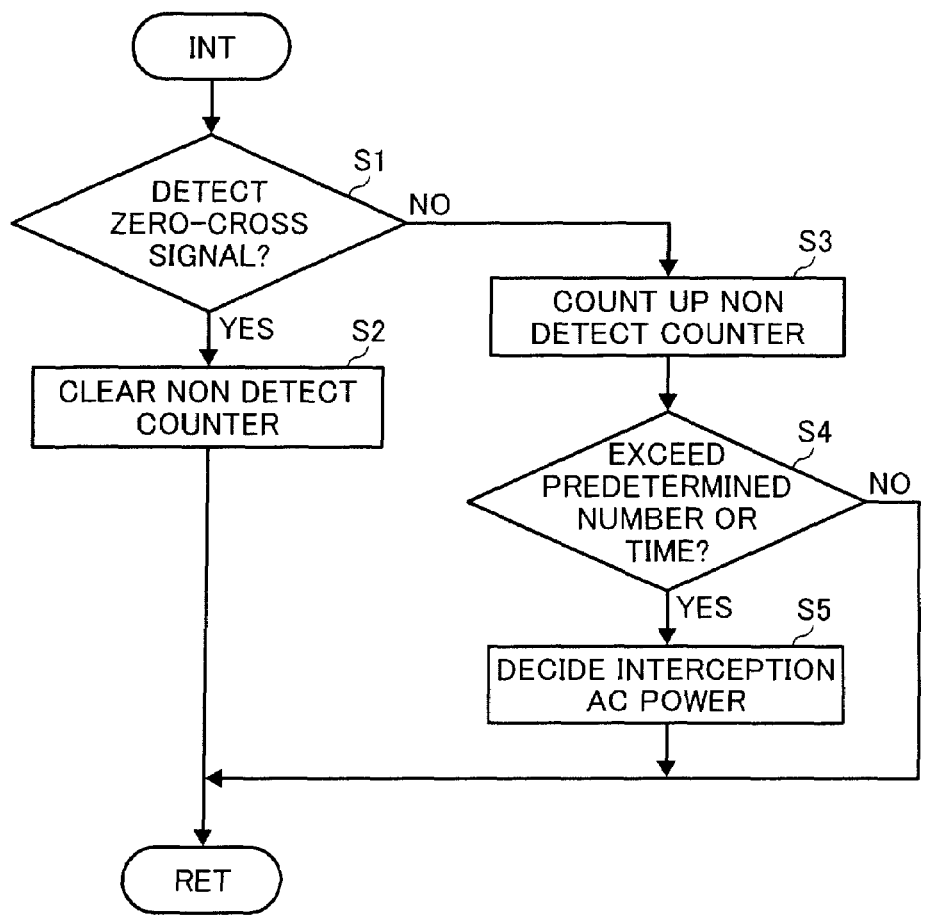
FIG. 5B is a flow chart showing an operation of detecting an AC power input cord not being connected to an AC source at a controller in the embodiment of FIG. 4A.

FIG. 5B is a flow chart showing an operation utilizing such a zero-cross detector to detect whether an AC power input cord #2 is connected to the AC source. The operation is FIG. 5B is performed at the controller 7.

As shown in FIG. 5B the controller 7 first waits to detect a zero-cross signal, at step 1. When the zero-cross signal is detected, Yes in step 1, the non-detect counter is cleared in step 2, and the operation is then ended.

If the zero-cross signal is not detected for a predetermined time, NO in step 1, then the controller 7 counts up values in the non-detect counter, at step 3. The controller 7 then determines whether the value in the non-detect counter exceeds a predetermined number or a non-detecting time exceeds a predetermined time, at step 4. The controller 7 can then determine a disconnection of the AC power input cord #2 to the AC power source if the non-detect counter exceeds the predetermined number or the non-detecting time exceeds a predetermined time, at step 5. When a non-zero crossing has not been detected for a certain time or count, that can provide an indication that no AC input voltage wave is provided to the zero-cross signal detector 13, which would thereby indicate that the AC power input cord #2 is not connected to an AC power source. Thereby, with the operation in FIG. 5B the controller 7 can determine a state of no connection of the AC power input cord #2 to the power source.

Figure 6:
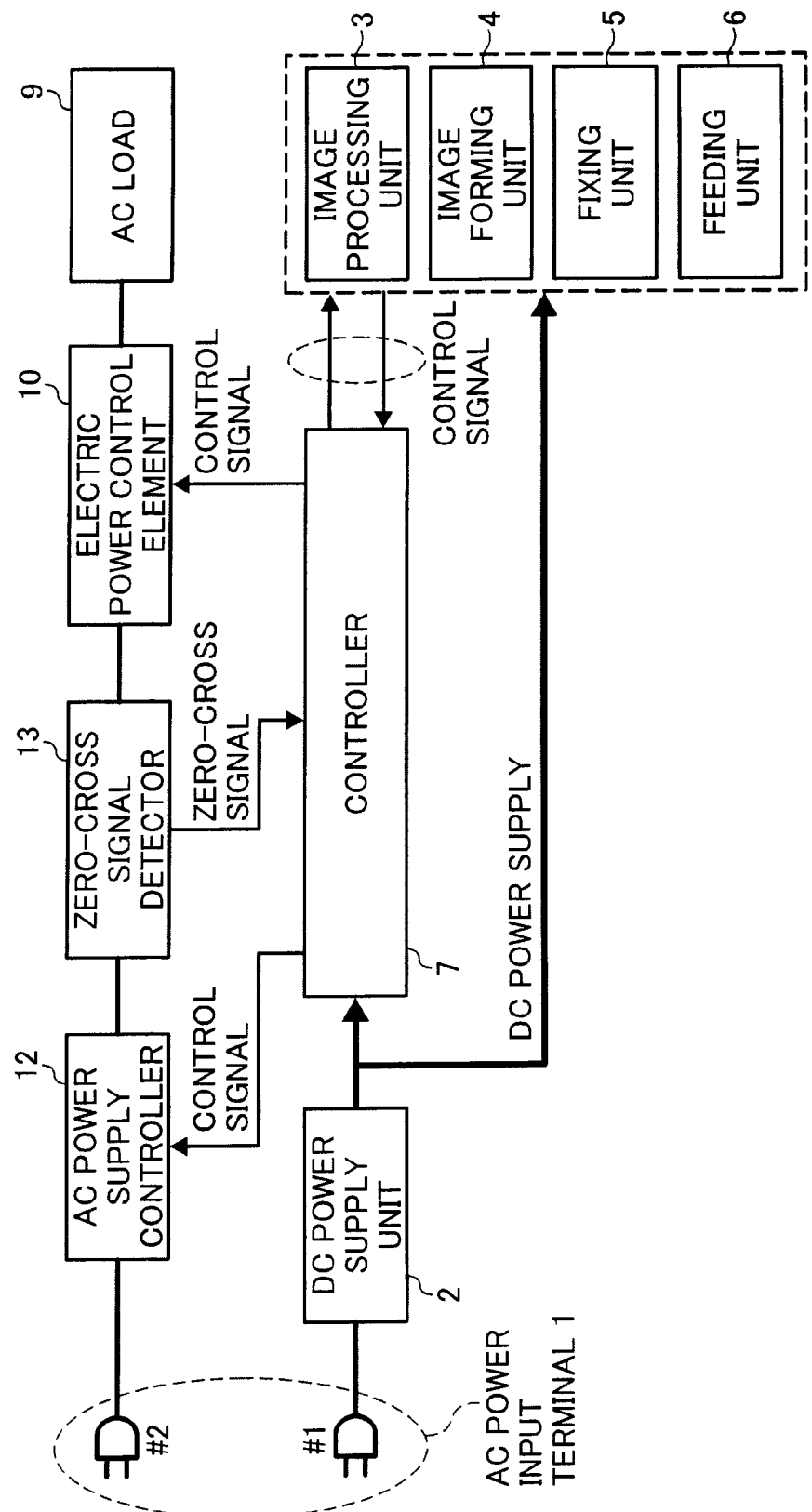
FIG. 6 is a block diagram showing construction of an image forming apparatus of another embodiment of the present invention including two AC power input cords, an AC power supply controller, and a zero-cross signal detecting unit.

FIG. 6 is a block diagram of construction of an image forming apparatus according to a further embodiment of the present invention that includes two AC power input cords #1 and #2, the AC power controller 12, and the zero-cross signal detector 13.

The image forming apparatus of FIG. 6 supplies AC power to the fixing unit 5 via the electric power control element 10 changing an ON/OFF state of an AC power line. An error in the image forming device can occur if the fixing unit 5 continues to receive a large quantity of AC power and may thereby overheat, for example by an error in the software or an error in operation of the electric power control element 10. The image forming apparatus of FIG. 6 includes the AC power supply controller 12 as a safeguard device, and which AC power supply controller 12 is provided between the electric power control element 10 and the AC power input cord #2. The embodiment of FIG. 6 specifically utilizes a relay in the AC power supply controller 12.

The AC power supply controller 12 cannot interrupt AC power if a connection point of the relay is improperly "welded" in an ON position. That is, in a relay device, if the switch portion of the relay element is in an ON position and an unusually large current is passed through the relay, that switch element may become "welded" in that ON position, and thereby the relay will improperly always be in that ON condition. The embodiment of the present invention shown in FIG. 6 can identify whether a relay in the AC power supply controller 12 has improperly been welded in such an ON position. Specifically, the image forming apparatus checks whether the connection point of the relay, before the image forming apparatus orders the relay to change from ON to OFF. The controller 7 checks the zero-cross signal, before the relay is ON. The controller 7 can then determine if the connection point of the relay is welded, if the controller 7 recognizes the zero-cross signal at that time (before the relay is ON the controller 7 should not detect a zero-cross signal). The controller 7 determines the relay of AC power supply controller 12 is normal and starts supplying AC power to the fixing unit by changing the relay to ON, if the controller 7 does not at that time of checking recognize the zero-cross signal.

Figure 7A:
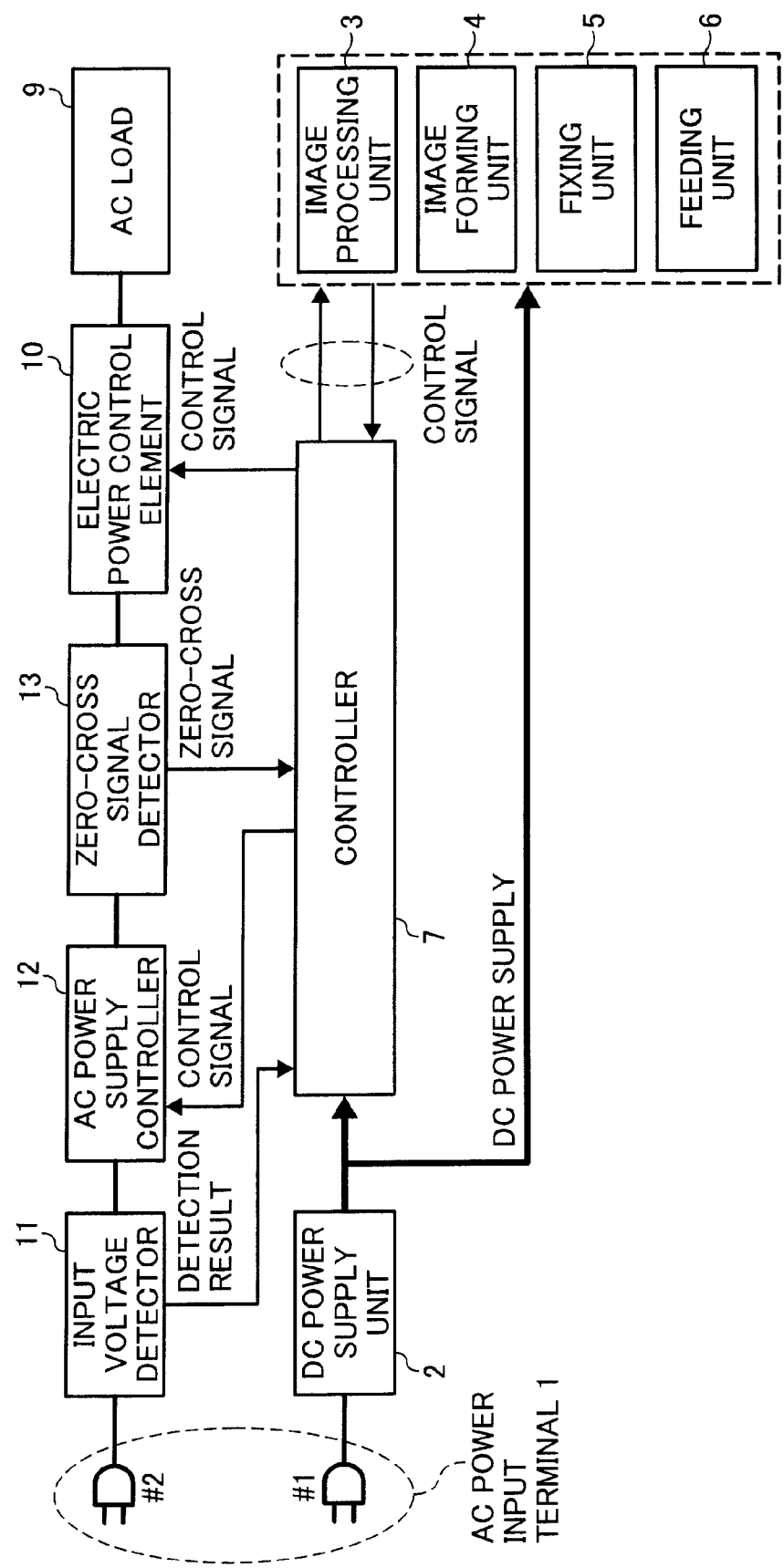
FIG. 7A is a block diagram showing construction of an image forming apparatus of another embodiment of the present invention including two AC power input cords, a connection detector, an AC power supply controller, and a zero-cross signal detecting unit.

FIG. 7A is a block diagram showing construction of an image forming apparatus of a further embodiment of the present invention that has two AC power input cords #1 and #2, the input voltage detector 11, AC power supply controller 12, and the zero-cross signal detecting unit 13.

In the embodiment in FIG. 7A the AC power supply controller 12 is provided between the AC power input cord #2 and the zero-cross signal detector 13. That is the preferred positioning of the AC power supply controller 12, rather than placing the AC power supply controller 12 between the zero-cross signal detector 13 and the electric power control element 10. If the AC power supply controller 12 was placed between the zero-cross signal detector 13 and the electric power control element 10, then the image forming apparatus may not be able to distinguish whether an error that arises is an error in the AC power input cord #2 not being connected to the AC source, or whether there is an error in the relay of the AC power supply controller 12, in an instance when a zero-cross signal is not detected. Thereby, in this embodiment the image forming apparatus provides the AC power supply controller 12 connected to the input voltage detector 11.

Figure 7B:
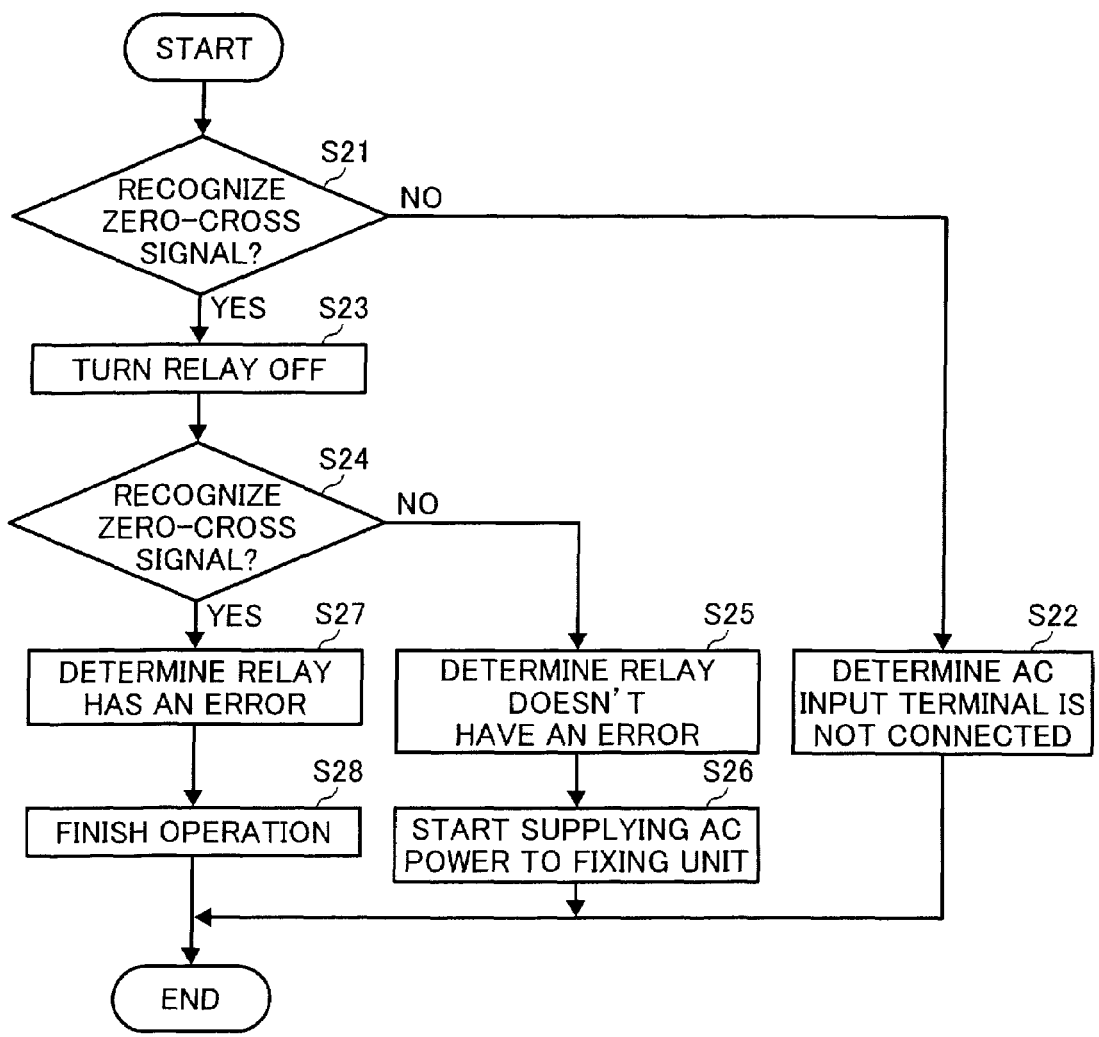
FIG. 7B is flow chart showing an operation of determining if an AC power supply controller generates an error or not in the embodiment of FIG. 7A.

FIG. 7B is flow chart of deciding whether the AC power supply controller 12 has an error condition or not.

First, in step 21 the controller 7 recognizes a zero-cross signal. The controller 7 then determines whether the AC power input cord #2 is not connected to the AC source if the controller 7 does not recognize the zero-cross signal, in step 22. If the controller recognizes the zero-cross signal, Yes in step 21, the controller 7 turns the relay of the AC power supply controller 12 OFF in step 23. The controller 7 then checks for the zero-cross signal again at step 24. If the zero-cross signal is still not detected by the controller 7, if No in step 24, the controller 7 then determines the relay is operating normally at step 25 and starts supplying AC power to the fixing unit 5 by changing the relay to ON in step 26. If the zero-cross signal is again recognized, Yes in step 24, the controller 7 determines the relay has an error condition in step 27, and finishes operating in step 28.

Figure 8A:
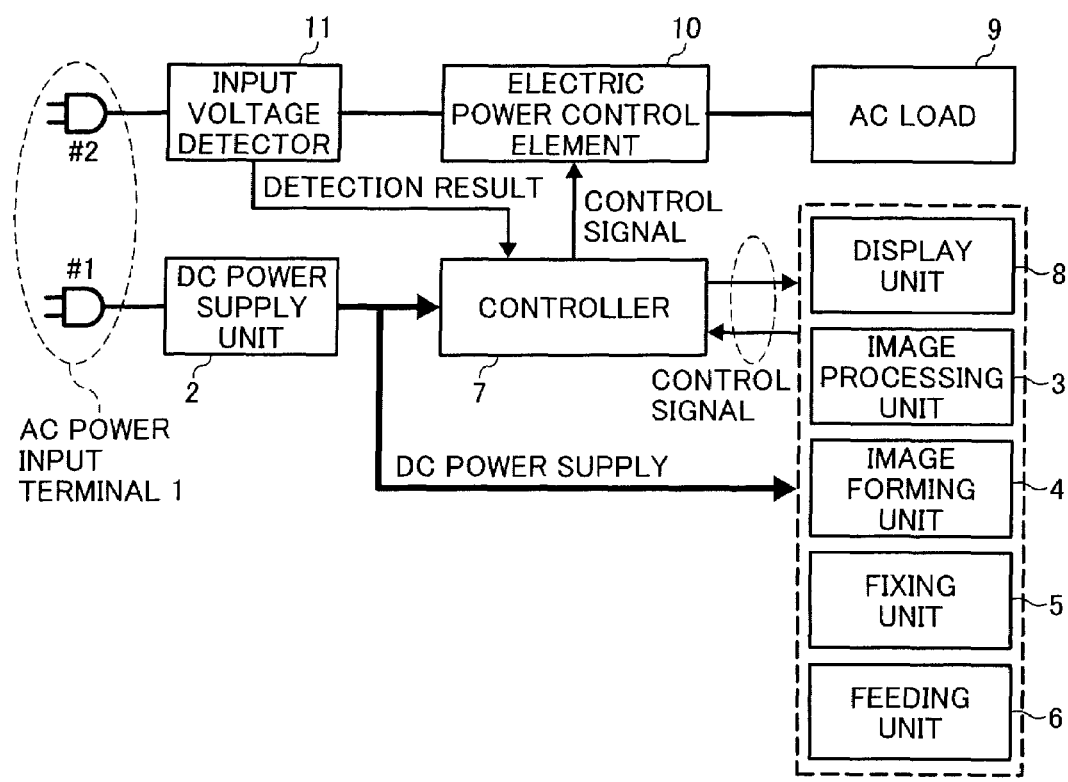
FIG. 8A is a block diagram showing construction of an image forming apparatus of another embodiment of the present invention including two AC power input cords and a display unit.

FIG. 8A is a block diagram showing construction of an image forming apparatus according to another embodiment of the present invention that has two AC power input terminals #1 and #2 and a display unit 8.

FIG. 8A shows the controller 7 also controls the display unit 8. The controller 7 controls the display unit 8 to display information that the AC power input terminal #2 is not connected to AC power source. The display unit 8 receives DC power from the DC power supply unit 2.

Figure 8B:
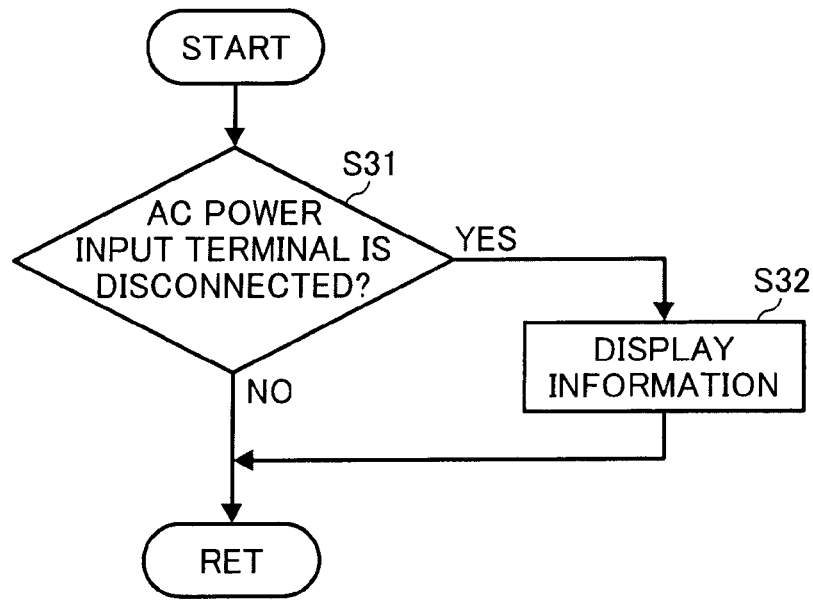
FIG. 8B is flowcharts of displaying an AC power input cord not connected to an AC source according to the embodiment of FIG. 8A.

FIG. 8B is flowchart of displaying the condition that the AC power input cord #2 is not connected.

The controller 7 determines whether the AC power input cord #2 is not connected to the AC source at a predetermined timing at step 31. If the controller 7 recognizes the AC power input cord #2 is not connected to the AC source, Yes in step 31, the controller 7 controls the display unit 8 to display information that the AC power input cord #2 is not connected to the AC source, and the display unit 8 displays the information, in step 32.

If the controller 7 recognizes the AC power input cord #2 is connected, No in step 31, the operation ends and the controller 7 will again check whether the AC power input cord #2 is connected to the AC source at a predetermined timing at step 31.

Figure 8C:
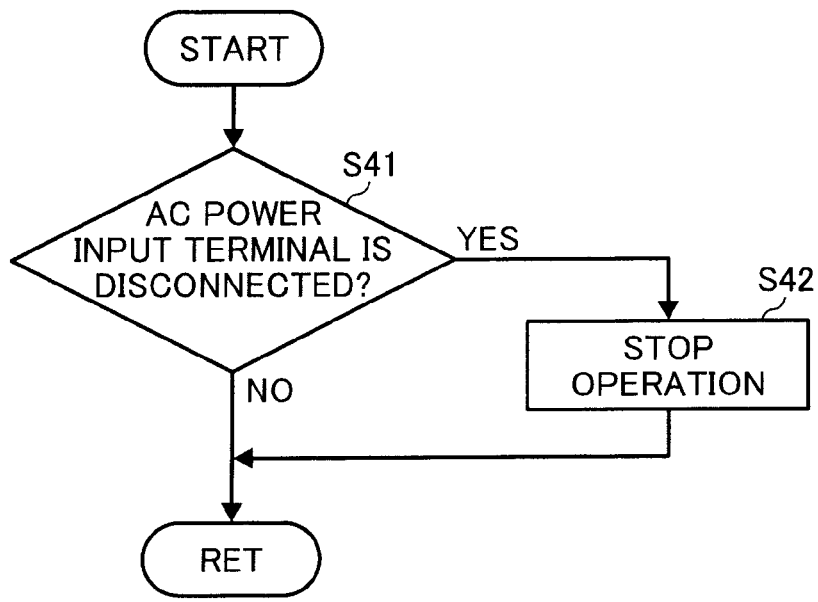
FIG. 8C is a flowchart of stopping operation of an image forming if an AC power input cord is not connected to an AC source.

FIG. 8C is flowchart of detecting whether the AC power input cord #2 is connected to the AC power source, and stopping an image forming operation.

In another embodiment, the controller 7 can order a related unit to stop operation of image forming, if the controller 7 recognizes the AC power input cord #2 is not connected to the AC source. That operation is executed because when the AC power input cord #2 is not connected to the AC source the fixing heater in the fixing unit 5 may not receive enough AC power to properly operate, so an image forming operation will not succeed successfully.

The controller 7 checks whether the AC power input cord #2 is not connected to AC source at a predetermined timing at step 41. If the controller 7 recognizes the AC power input cord #2 is not connected to the AC source, Yes in step 41, the controller 7 orders the related unit, for example the image forming unit 4, etc., to stop an operation of image forming, in step 42.

If the controller 7 recognize the AC power input cord #2 is connected to the AC source, NO in step 41, the operation ends and the controller 7 will again check whether the AC power input cord #2 is connected to AC source at a predetermined timing at step 41.

Figure 9A:
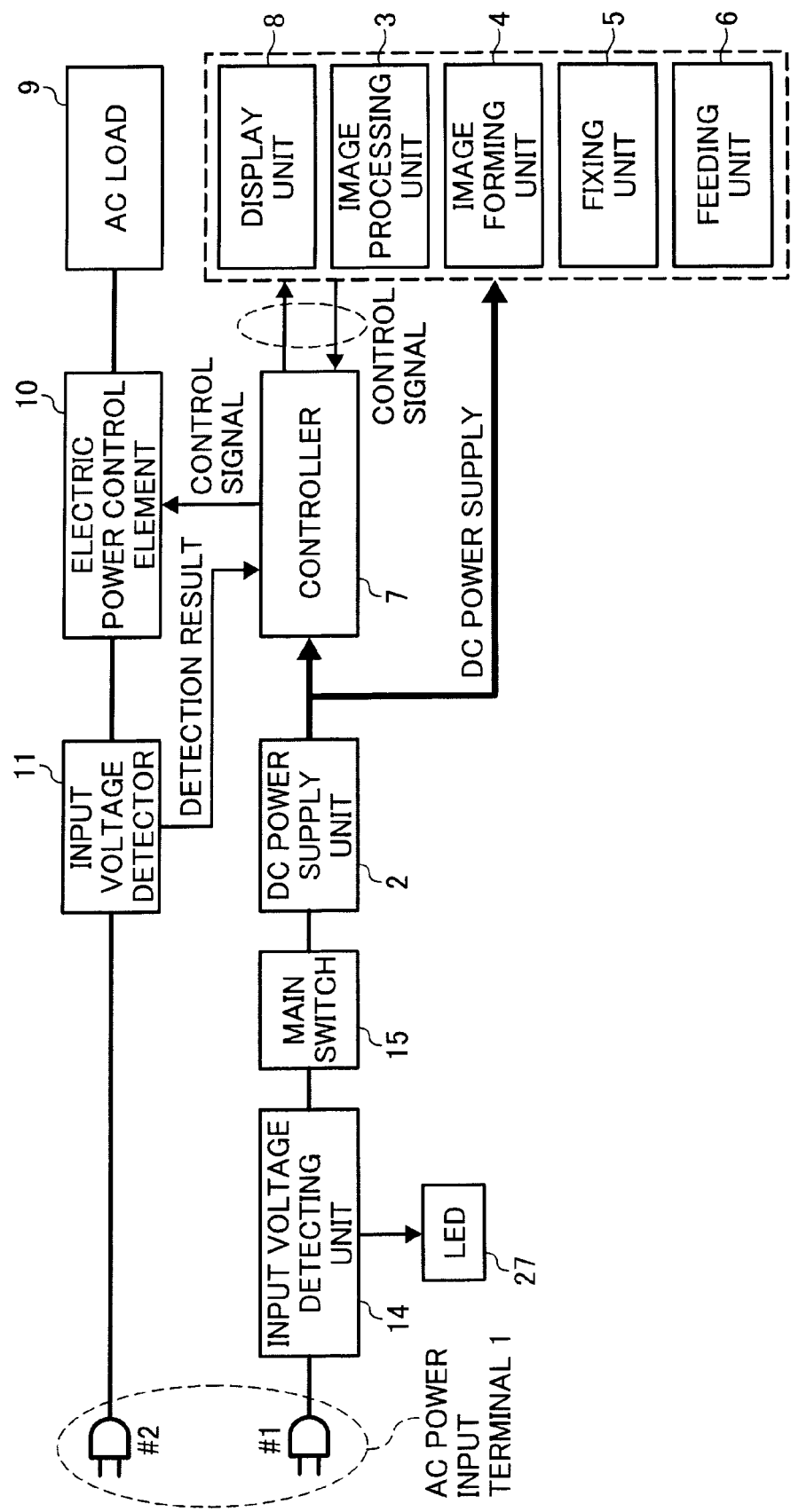
FIG. 9A is a block diagram showing construction of an image forming apparatus of another embodiment of the present invention including an electric circuit of an input voltage detecting unit including an LED.

FIG. 9A is a block diagram showing construction of an image forming apparatus according to another embodiment of the present invention that includes an input voltage detecting unit 14 and an LED 27.

The electric circuit of the input voltage detecting unit 14 detects an input voltage of the AC power input cord #1. A main switch 15 is a main power switch for the image forming device to be turned ON/OFF.

The image forming apparatus includes the input voltage detecting unit 14, connected to the LED 27, between the AC power input cord #1 and the main switch 15. The LED 27 is ON if the input voltage detecting unit 14 detects a voltage, i.e., if the AC power input cord #1 is connected to the AC power source. The user can thereby easily understand if the AC power input cord #1 is connected to the AC source, if the LED 27 is ON. And the user can understand the AC power input cord #1 is not connected to the AC source, if the LED 27 is not ON. Thereby, with this further embodiment the user can easily see if the AC power input cord #1 is not connected to AC source or if the main switch 15 is OFF, as the image forming apparatus includes the input voltage detecting unit 14, connected to the LED 27, between the DC power supply unit 2 and the main switch unit 15.

Figure 9B:
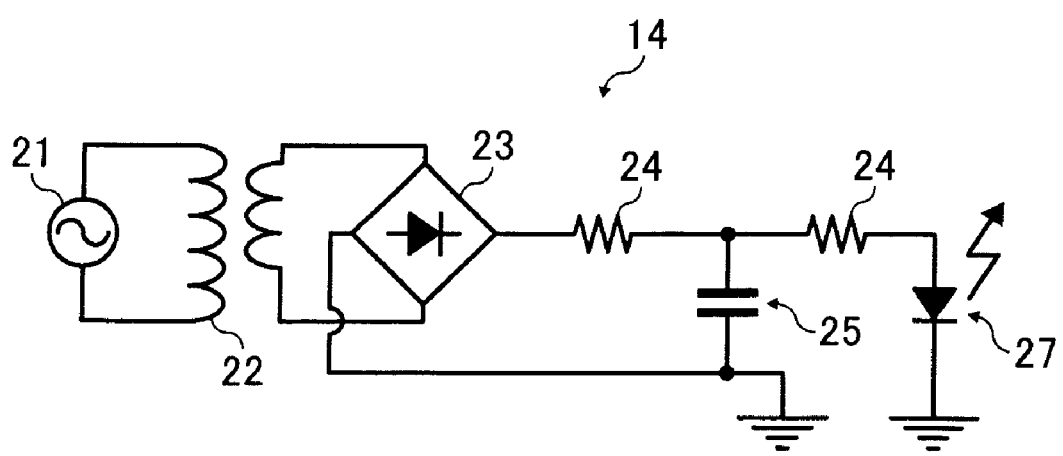
FIG. 9B shows an electric circuit of a connection detector of FIG. 9A.

FIG. 9B shows the electric circuit of the input voltage detecting unit 14. FIG. 9B shows that circuit 14 includes an AC source 21, a transformer 22, a diode 23, a resistor 24, a condenser 25, and is connected to the LED 27.

In the embodiment of the present invention noted above in FIG. 9A, and in addition to the other embodiments, the controller 7 determines whether the AC input power cord #2, and AC input power cord #1 in the embodiment of FIG. 9B, are connected to the AC source, based on input detection signals. The timing at which the controller 7 makes such a determination can be varied.

In the embodiment of FIG. 9B the controller 7 can determine whether the AC power input cords #1 and #2 are connected to the AC source for example when the main power switch 15 of the image forming apparatus is changed from OFF to ON, i.e., when the image forming apparatus is turned ON. The same operation could be realized in the other embodiments.

Further, in any of the embodiments the controller 7 can determine whether the AC power input cords #2, and AC power input cord #1 in the embodiment of FIG. 9B, is connected at any predetermined timing after the image forming apparatus is turned ON, and/or if the image forming apparatus detects that the fixing unit 5 is not heating up after a predetermined timing, or at other timings.

Obviously, numerous modifications and variations of the present invention are possible in light of the above teachings. It is therefore to be understood that within the scope of the appended claims, the invention may be practiced otherwise than as specifically described herein.

The invention claimed is:

1. An image forming apparatus comprising:
   a first AC power input cord to be connected to an AC source;
   a second AC power input cord to be connected to the AC source;
   a DC power supply unit connected to the first AC power input terminal;
   an AC load configured to receive AC power from the second AC power input terminal via an electric power control element;
   a voltage state detector configured to detect a voltage state of the second AC power input cord;
   a controller connected to the DC power supply unit, wherein the controller controls the electric power control element and determines whether the second AC power input cord is connected to the AC source based on the detecting result output by the voltage state detector; and
   an AC power supply controller configured to control an output from the AC source by opening or closing, wherein the AC power supply controller is connected between the second AC power input cord and the electric power control element;
   wherein the voltage state detector is connected between the second AC power input cord and the AC power supply controller,
   wherein the voltage state detector comprises a zero-cross signal detector configured to detect a zero-cross signal,
   wherein the zero-cross detector is connected between the second AC power input cord and the electric power control element, and
   wherein the controller is configured to determine whether the second AC power input cord is connected to the AC source, if the zero-cross signal detecting unit detects disappearance of the zero-cross signal.

2. The image forming apparatus is as claimed in claim 1, wherein the AC power supply controller is connected between the second AC power input cord and the zero-cross signal detector.

3. The image forming apparatus is as claimed in claim 1, wherein the AC power supply controller and the zero-cross signal detector are connected between the second AC power input cord and the electric power control element, and
the controller is configured to control the AC power supply controller.

* * * * *